May 27, 1969

A. VARY 3,446,997

TRIODE THERMIONIC ENERGY CONVERTER

Filed Oct. 22, 1965

INVENTOR
ALEX VARY
BY
ATTORNEYS

INVENTOR.
ALEX VARY

United States Patent Office 3,446,997
Patented May 27, 1969

3,446,997
TRIODE THERMIONIC ENERGY CONVERTER
Alex Vary, North Olmsted, Ohio, assignor to the United States of America as represented by the Administrator of the National Aeronautics and Space Administration
Filed Oct. 22, 1965, Ser. No. 502,746
Int. Cl. H02n 3/00, 7/00
U.S. Cl. 310—4        5 Claims

ABSTRACT OF THE DISCLOSURE

A vacuum thermionic converter having an electron emitting electrode disposed adjacent to a collector electrode having openings which allow electrons to pass therethrough and impinge on a biasor electrode which is directly connected to the emitter electrode causing a short circuit condition wherein the converter operating point is located on the high current portion of the converter's output characteristic curve. The collector bleeds off some of the electron flow and diverts it to a variable load impedance connected between the collector electrode and the emitter electrode thereby energizing the load impedance. The electrodes may be flat or cylindrical and may be disposed in parallel or coaxial relationship with respect to one another.

---

The invention described herein may be manufactured and used by or for the Government of the United States of America for governmental purposes without the payment of any royalties thereon or therefor.

This invention relates generally to a thermionic electrical power source and more particularly to a new and improved thermal-to-electrical energy converter in which heat energy is converted directly into electrical energy.

The art and technology of direct energy conversion by means of thermionic devices is currently largely in the experimental stage, and a number of techniques have heretofore been utilized in an attempt to increase the output efficiency of said devices. To make these devices more efficient three basic techniques have heretofore been used.

For example, one such technique has been to reduce the spacing or distance between the emitting and collecting electrodes to overcome the effect of accumulated negative space-charge therebetween.

Normally, in a thermionic converter the electron flow between the emitter and collector electrodes is limited primarily by two factors: the supply of electrons and the formation of a space charge barrier formed by electron accumulation in the interelectrode space. At any given temperature of the emitter the supply of electrons given off by said emitter is limited by the work function potential of the emitter surface. The more electrons that reach the collector electrode the more efficient is the thermionic conversion of the said device. However, some of the electrons that are given off by the emitter electrode do not cross the interelectrode space and do not reach the collector electrode because the energy which they possess when they leave the emitter electrode is insufficient to carry them through the interelectrode space charge barrier to the collector electrode. An increase in the supply of electrons may be accomplished by raising the temperature of said emitter so that more electrons possess energies greater than the work function potential thereof and escape from the surface of the emitter electrode. Only those electrons possessed of an energy that is greater than a predetermined minimum value, which is characteristic of the material used as the emitter electrode, are able to overcome this work function potential or surface energy and succeed in escaping. Electrons leaving the emitter electrode tend to form a negatively charged cloud or space charge which acts as a further barrier to electron flow to the collector. Electrons not possessing sufficient energy to penetrate the space charge barrier are forced back to the emitter electrode.

In a vacuum thermionic converter by reducing the interelectrode spacing between the emitter and collector electrodes to a distance approximately smaller than the distance between the space charge cloud and emitter electrode, additional electrons having lower energies are able to reach the collector electrode. By this means the electron flow from the emitter to collector is increased in a vacuum diode thermionic converter because the space charge barrier is essentially eliminated from the interelectrode space.

However, it has been determined that merely reducing the space between electrodes is unsatisfactory because the distance between the collector and emitter electrodes needs to be one thousandth of an inch or less in present day devices. In addition to the apparent severe problems of construction of such miniature devices, the maintenance of the interelectrode spacing at elevated temperatures is most difficult.

Still another technique used in a gas thermionic converter has been the introduction of an easily ionized gas or vapor into the interelectrode spacing in an effort to neutralize the space charge. For example, neutralization of the space charge by cesium vapor has been widely employed using vapor pressures from one-tenth to several thousands of microns of mercury. The basic shortcoming of this technique is the contamination of insulators by the cesium vapor which causes electrical short-circuiting thereof. In addition it is substantially difficult to produce and maintain appropriate levels of cesium vapor pressure and density so as to prevent the electrode surfaces from being adversely affected by the vapor.

Still a third widely used technique has been the imposition of an external magnetic field to the thermionic device; however, it has been found that such application of external magnetic field(s) does not operate to increase efficiencies in and of itself. Together with space-charge neutralization, however, it does enhance the efficiency of operation to some extent.

The thermionic converter of the present invention utilizes still another concept which heretofore has been avoided inasmuch as it has been assumed that its use would result in the consumption of more energy than it is possible to generate by its presence.

More specifically, the present invention relates to a new and novel thermionic converter which has three electrode elements, namely, an emitting electrode, collecting electrode and a bias electrode; and which, in turn, are geometrically arranged and electrically interconnected in such manner as to utilize the short-circuit characteristics of the converter to substantially increase the electron transmission thereof and hence the efficiency of energy conversion of said converter.

It is therefore a primary object of the present invention to provide a new and novel thermionic converter which has a substantially high efficiency of thermal-to-electrical energy conversion.

Another object of the present invention is to provide a new and novel thermionic converter which functions to reduce the accumulation of negative space-charge build-up in the interelectrode region of the converter.

Still another object of the present invention is to provide a novel thermionic converter which utilizes its short circuit characteristics to substantially increase the thermal-to-electrical conversion of energy of said converter.

Another object of the present invention is to provide a novel and improved thermionic converter which utilizes a unique collector electrode structure to increase the electron transmission through the interelectrode space.

Still another object of the present invention is to provide a thermionic converter which may partake of either parallel-planar or coaxial-cylindrical configurations by selecting the appropriate sequence of the triode electrode elements thereof.

Another object of the present invention is to provide a new and novel thermionic converter which may be operable to produce a cyclic output which may be made to vary sinusoidally or in various other modes with respect to a chosen bias voltage and/or current.

Additional objects and advantages of the thermionic converter of the present invention will become apparent to one skilled in the art to which it pertains and upon reference to the embodiment as is disclosed herein and which is illustrated in the accompanying drawings wherein.

Briefly, the invention described herein provides a new and novel triode thermionic converter wherein the short-circuit phenomenon which occurs in the diode type converter are utilized to enhance the energy conversion.

Figure 1A:
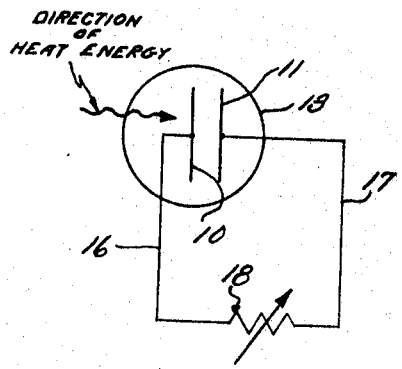
FIG. 1A is a schematic circuit diagram of a diode configuration of thermionic converter.
Figure 1B:
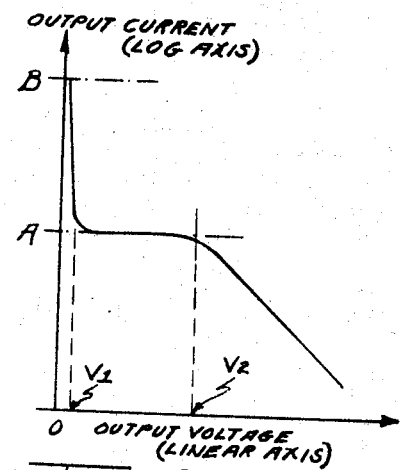
FIG. 1B is a graph illustrating the output current-output voltage relationship of the emitter-collector circuit that is realized in operating the thermionic converter of FIG. 1A in the manner to practice the inventive concepts of the present invention.

With reference now directed to FIGS. 1A and 1B, there is herein shown a typical diode type of thermionic converter and its associated output current-output voltage characteristic operational curve, the diode configuration thereof having an emitter electrode 10 and a collector electrode 11 enclosed within a suitable evacuated evacuated envelope 13. A source of heat energy such as a conventional heater electrode (not shown) may be disposed adjacent the emitter electrode 10 so as to heat the same to effect the expulsion of electrons therefrom.

The principle of operation of the present invention as aforementioned is based on the short-circuit phenomenon which occurs in the thermionic diode energy converter. Assuming that the emitter electrode 10 and collector electrode 11 are connected together by means of an external circuit such as conductors 16 and 17 in series with a variable load resistance 18, a plot of output current versus output voltage may be obtained as seen in FIG. 1B identifying the operational characteristic of the converter.

Assuming that the load may be adjusted to obtain a dead-short circuit between the emitter and collector electrodes it has been determined that as the dead-short is closely approached by reducing the impedance of resistance 18 there is an output voltage as defined at $V_1$ below which a radical increase in output current occurs.

Above this voltage level $V_1$ to approximately the voltage level $V_2$, the short-circuit current output as identified at A is seen to be somewhat constant, as the load impedance is likewise increased, the current becoming progressively reduced above the voltage level $V_2$ as said load impedance is additionally increased.

As the load impedance is reduced toward dead-short between the emitter and collector (typically below one-tenth ohm) is present day converters, whereby the voltage level of the collector approaches that of the emitter, a radical increase in output current is obtained, and the short-circuit current resulting therefrom is identified at B or higher. A space-charge "bleed-off" appears to occur which causes the dead-short output current to increase to the maximum possible value that is determined by the saturated emission property of the emitter material. Consequently, by operating the collector electrode of the converter at a selected point near dead-short condition, maximum output current may be obtained.

Figure 3:
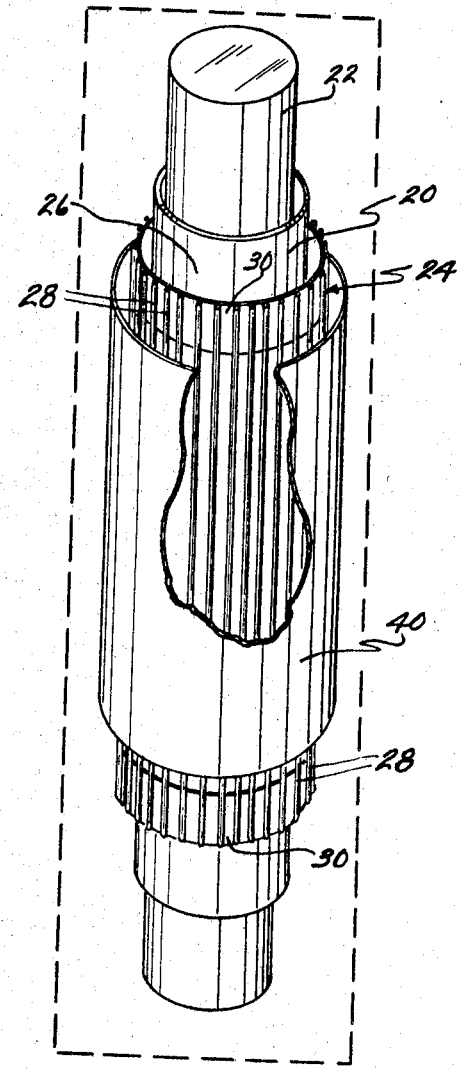
FIG. 3 is a perspective view showing the coaxial configuration of triode thermionic converter; and, FIG. 4 is a perspective view showing the parallel-planar configuration of converter.

A coaxial configuration of triode converter embodying the short circuit characteristics as just defined is illustrated in FIGURE 3. In this assembly, the emitter electrode 20 is seen to consist of a cylinder which is coaxial with the heat source which may be one of several types including electrical, nuclear, or isotopic as identified schematically at 22. The emitter electrode 20 for example may be formed of tungsten, tantalum or other refractory material either pure or "doped" as referred to in the art to achieve appropriate levels of electron emission. The collector electrode 24 which is coaxial with the emitter electrode as to extend therearound in spaced relation thereto to define interelectrode spacing 26 is seen to be cage or grid-like in structure being formed of a plurality of longitudinally extending wires or rods 28 which are preferably equally spaced as to define a cylinder, each of said rods being connected at each end by any suitable means such as welding to an annular shaped end member 30 to thereby define an integral unit.

A typical collector electrode as herein shown in FIGURE 3 may be constructed of tantalum rods 40 mils in diameter and 4 inches long which are welded to tantalum annuli or end members formed from strips ⅜ inch wide and about 50 mils thick. The end members are formed preferably with splines on their outside diameters to position and space the rod elements which, in the instant assembly, are forty-eight in number in equal spaced relation therearound. Although not shown herein, alternate modes of collector electrode construction may be wire mesh or a slotted cylinder wherein the void regions and cross-sections are chosen to afford optimum electrical impedance and miximum transmittance. The third electrode herein defined as the bias electrode or "biasor" as indicated at 40 is a solid-walled cylinder which surrounds the collector electrode 24 so as to be coaxial therewith. Inasmuch as the collector electrode is constructed to have approximately 50 percent void space, electrons are easily transmitted through it from the emitter electrode to the biasor. The biasor electrode 40 is also preferably formed of a refractory material such as tantalum, molybdenum, or tungsten.

Figure 2:
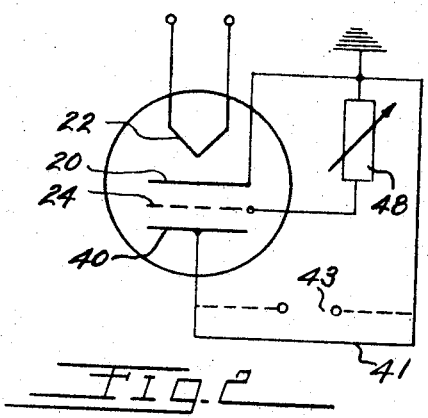
FIG. 2 is a schematic diagram of the triode configuration of thermionic converter embodying the present invention.

The triode converter is connected into an electrical circuit having a configuration as shown in FIGURE 2 wherein the biasor 40 is seen to be connected directly by conductor 41 to the emitter electrode 20 so that a dead-short circuit exists between the two. Alternatively, a voltage source (not shown) which may be of any preselected cyclic configuration may be connected between said electrodes as shown at 43 to elevate the biasor to a small positive potential with respect to the emitter electrode and to thereby vary the potential of said biasor electrode at the frequency of said source. With this circuit, and if infinite load impedance as indicated at 48 is assumed to be connected between the collector electrode 24 and emitter electrode 20 the biasor 40 will tend to draw the full dead-short circuit current as explained above and of a substantially large magnitude as indicated at B in FIGURE 1B. In the case of the cyclic voltage source applied at point 43 across the biasor and emitter electrodes, the current output therebetween will be of the same cyclic configuration as said source.

A similar mode of operation may be obtained by replacing the dead-short circuit between the emitter electrode and biasor with a device whose impedance can be varied. Such a device may be a transistor whose impedance may be varied according to some preselected mode by means of an appropriate electrical signal.

As the load impedance 48 is lowered it will be found that more of the output current is intercepted by the collector electrode 24 and there will be a certain magnitude of load impedance at which optimum power is drawn by the collector electrode. It has been found that the biasor electrode as connected to the emitter electrode so modifies the space-charge normally found in the interelectrode region 26 between the emitter and collector electrodes that the transmitted current is at least an order of magnitude greater than is realized with a diode converter and consequently provides a triode or three element thermionic converter which has a substantially larger capability of output energy then does the diode or two element converter similarly constructed.

Figure 4:
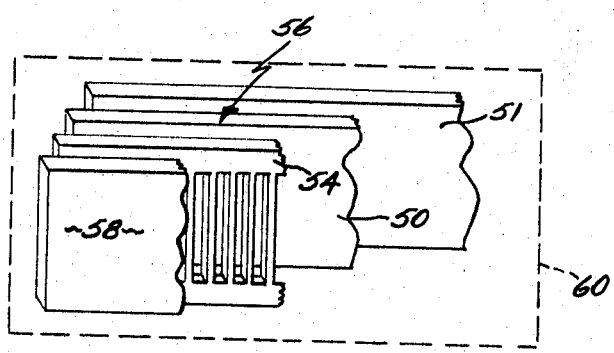

As heretofore mentioned, the triode converter assembly may be of parallel-planar configuration such as is shown in FIG. 4.

In this assembly, the emitter electrode as identified at 50 is somewhat rectangular in its present configuration, and disposed closely adjacent a suitable heater element 51 in parallel spaced relation thereto and which is capable of heating said emitter sufficiently to expel electrons therefrom.

The collector electrode at 54 is seen to be somewhat ladder-shaped in construction and disposed closely adjacent the emitter electrode 50 in parallel spaced relation thereto on the side thereof opposite the heater element 51 to define the interelectrode spacing 56 therebetween.

The biasor electrode 58 is likewise of rectangular configuration, and is disposed closely adjacent the collector electrode 54 similarly spaced therefrom on the side thereof opposite the collector electrode 54, said electrodes emitter, collector and biasor being in approximate stacked relation to readily permit the transfer of electrons therebetween. The complete assembly is intended to be mounted within a suitable conventional envelope 60 and connectible into a triode circuit of the type illustrated in FIG. 2.

Either the parallel-planar or coaxial-cylindrical configuration of the triode thermionic converter of the present invention as just described will permit its operation in a vacuum without the usual requirement of having a very small spacing between the emitter and collector electrodes. Additionally, the use of a neutralizing medium such as cesium vapor may also be avoided.

Figure 5A:
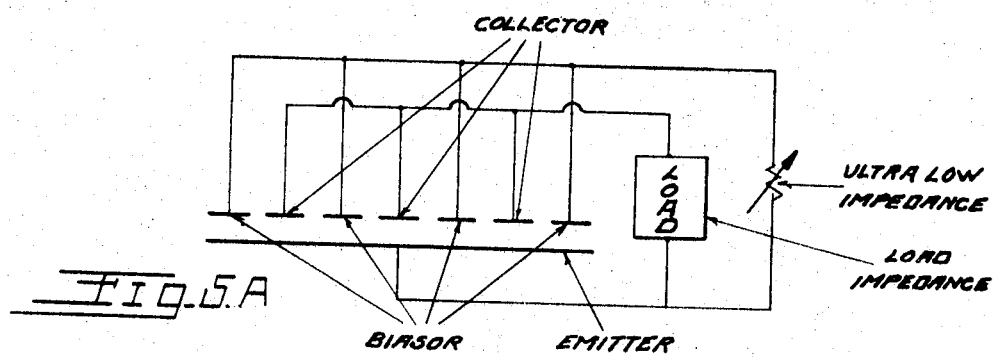
Figure 5B:
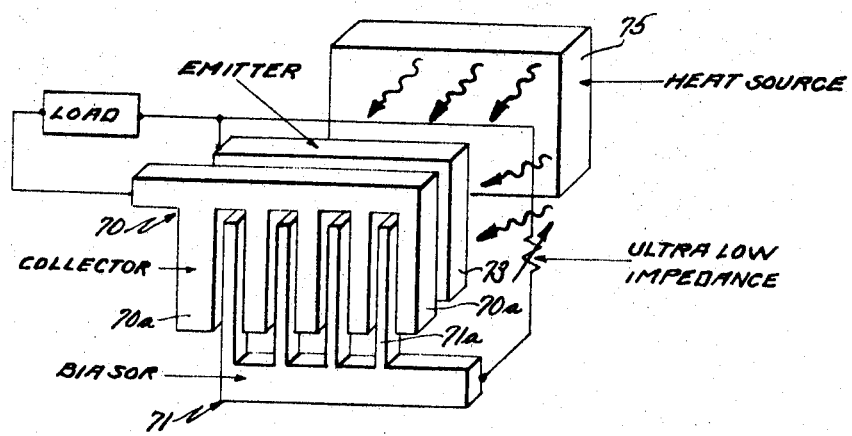

Another alternative configuration of thermionic converter is represented in FIGS. 5A and 5B in which the collector electrode 70 and biasor electrode 71 are combined so as to define a single planar surface in the form of two inter-meshed combs such that their separate elements or teeth as depicted at 70a and 71a respectively do not come into contact with each other.

As shown in FIG. 5B, the emitter electrode 73 is disposed in its normal position in close juxtaposition to said combination collector-biasor surface so as to provide an electric flow thereto. A suitable heat source indicated at 75 is likewise disposed in heat transfer relation to the emitter electrode 73 effective to elevate its temperature to the electric emission range.

As shown in the wiring diagram of this assembly in FIG. 5A, the output load impedance is seen to be connected in the normal manner between the collector-biasor electrode and the emitter electrode. The ultra-low impedance also may be a dead short, a variable low impedance as shown or a voltage source as disclosed at 43 in the FIG. 2 embodiment.

Although not herein shown, the collector-biasor electrode may also be cylindrical in configuration wherein the collector and biasor electrodes are coaxially arranged to form a single cylinder surrounding an emitter electrode.

Having thus described several preferred embodiments of triode thermionic converter it will now be apparent that the inventive concepts herein provide a triode converter assembly which is especially designed to use the short-circuit characteristics of the emitter-biasor circuit thereof to provide a maximum collector current output.

Likewise, it will be seen that the mode of operation of the triode converter of the present invention utilizing the shortcircuit characteristics of the emitter-biasor circuit is effective to reduce space charge accumulation in the inter-electrode space between the emitter and collector electrodes.

Further, it is also seen that the triode converter of the present invention may partake of several configurations such as parallel-planar and coaxial-cylindrical.

And, it will also be realized that the collector-emitter output of the converter may be made of any predetermined cyclic configuration by correspondingly varying the potential of the biasor electrode with respect to the emitter electrode.

Having thus described several preferred embodiments of triode thermionic converter embodying the present invention it will be realized that the same is susceptible to various modifications, combinations and arrangements of parts without departing from the inventive concepts as are defined in the claims.

What is claimed is:

1. A thermionic converter comprising: an evacuated envelope, a source of heat energy, an emitter electrode adjacent said source being heated thereby so as to eject electrons therefrom, a collector electrode disposed adjacent said emitter electrode to define an interelectrode spacing therebetween, said collector electrode being grid-like in construction to permit electrons to pass therethrough, a biasor electrode disposed adjacent said collector electrode on the side thereof opposite to said emitter electrode, said biasor electrode being connected in short circuit relation with said emitter electrode and effective to cause a short circuit condition electron flow therebetween, said emitter, collector, and biasor electrodes being disposed in said evacuated envelope, variable impedance means interconnecting said emitter and collector electrodes being adjustable to effect a diversion of electron flow from said biasor to said collector electrode and a bleed off of electrons in the space charge in said electrode spacing to provide a maximum output current for said converter.

2. In a thermionic converter as is defined in claim 1 and wherein the emitter, collector and biasor electrodes are disposed in parallel spaced relation to each other.

3. In a thermionic converter as is defined in claim 1 and wherein the emitter and collector electrodes are in coaxial relationship with respect to the source of heat energy.

4. In a thermionic converter as is defined in claim 1 and wherein the biasor electrode is in coaxial spaced relation with respect to said collector electrode.

5. A thermionic converter comprising: an evacuated envelope, a source of heat energy, an emitter electrode adjacent said source being heated thereby so as to eject electrons therefrom, a collector electrode of planar comb-like configuration, a biasor electrode of planar comb-like configuration disposed in intermeshed relation with said collector electrode to define a collector-biasor surface disposed adjacent said emitter electrode to establish an interelectrode spacing therebetween, said biasor electrode being connected in short circuit relation with said emitter electrode and effective to cause a short circuit condition electron flow therebetween, said emitter, collector, and biasor electrodes being disposed in said evacuated envelope, variable impedance means interconnecting said emitter and collector electrodes to effect a diversion of electron flow from said biasor to said collector electrode and a bleed off of electrons in the space charge in said interelectrode spacing to provide a maximum output current for said converter.

References Cited

UNITED STATES PATENTS

| | | | |
|---|---|---|---|
| 2,881,384 | 4/1959 | Dorant | 322—2 |
| 2,915,652 | 12/1959 | Hatsopoulos et al. | 310—4 |
| 3,021,472 | 2/1962 | Hernquist | 322—2 |
| 3,118,107 | 1/1964 | Gabor | 310—4 XR |
| 3,119,059 | 1/1964 | Hall et al. | 310—4 XR |
| 3,202,844 | 8/1965 | Hatch | 310—4 |
| 3,239,745 | 3/1966 | Hernqvist | 310—4 XR |
| 3,312,840 | 4/1967 | Gabor | 310—4 |

FOREIGN PATENTS 251,544 12/1962 Australia.
629,075 3/1963 Belgium.

MILTON O. HIRSHFIELD, *Primary Examiner.*

D. F. DUGGAN, *Assistant Examiner.*

U.S. Cl. X.R.

322—2